United States Patent
Shraer et al.

(10) Patent No.: US 9,405,846 B2
(45) Date of Patent: Aug. 2, 2016

(54) PUBLISH-SUBSCRIBE BASED METHODS AND APPARATUSES FOR ASSOCIATING DATA FILES

(75) Inventors: Alexander Shraer, San Francisco, CA (US); Maxim Gurevich, Cupertino, CA (US); Vanja Josifovski, Los Gatos, CA (US); Marcus Fontoura, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 191 days.

(21) Appl. No.: 13/297,131

(22) Filed: Nov. 15, 2011

(65) Prior Publication Data

US 2013/0124509 A1    May 16, 2013

(51) Int. Cl.
*G06F 17/30* (2006.01)

(52) U.S. Cl.
CPC ...... *G06F 17/3089* (2013.01); *G06F 17/30867* (2013.01)

(58) Field of Classification Search
CPC ................................................ G06F 17/30867
USPC ......... 707/706, 713, 722, 723, 736, 758, 781, 707/999.003–6
See application file for complete search history.

(56) References Cited

U.S. PATENT DOCUMENTS

| | | | | |
|---|---|---|---|---|
| 5,616,876 A | * | 4/1997 | Cluts | 84/609 |
| 2007/0118498 A1 | * | 5/2007 | Song et al. | 707/1 |
| 2007/0239535 A1 | * | 10/2007 | Koran et al. | 705/14 |
| 2008/0098420 A1 | * | 4/2008 | Khivesara et al. | 725/32 |
| 2010/0223261 A1 | * | 9/2010 | Sarkar | 707/726 |
| 2011/0029636 A1 | * | 2/2011 | Smyth et al. | 709/217 |
| 2012/0291070 A1 | * | 11/2012 | Feng et al. | 725/40 |

OTHER PUBLICATIONS

Author: Vanja Josifovski Title: Comparison of similarity search algorithm over inverted indexes Pertinent pp. 9 Date: Sep. 27, 2010.*
M. K. Aguilera, R. E. Strom, D. C. Sturman, M. Astley, and T. D. Chandra. Matching events in a content-based subscription system. In PODC. ACM, 1999.
V. N. Anh and A. Moffat. Pruned query evaluation using pre-computed impacts. In SIGIR, pp. 372-379, 2006.
B. Babcock, S. Babu, M. Datar, R. Motwani, and J. Widom. Models and issues in data stream systems. In Proceedings of the twenty-first ACM SIGMOD-SIGACT-SIGART symposium on Principles of database systems, PODS '02, pp. 1-16, New York, NY, USA, 2002. ACM.
R. Baeza-Yates and B. Ribeiro-Neto. Modern Information Retrieval. Addison Wesley, New York, NY, 1999.
G. Banavar, T. Chanra, B. Mukherjee, J. Nagarajarao, R. E. Strom, and D. C. Sturman. An efficient multicast protocol for content-based publish-subscribe systems. In ICDCS, 1999.
C. Böhm, B. C. Ooi, C. Plant, and Y. Yan. Efficiently processing continuous k-nn queries on data streams. In ICDE'07, pp. 156-165, 2007.

(Continued)

*Primary Examiner* — Syling Yen
(74) *Attorney, Agent, or Firm* — Berkeley Law & Technology Group, LLP

(57) ABSTRACT

Various methods and apparatuses are provided which may be implemented using one or more computing devices within a networked computing environment to employ publish-subscribe techniques to associate subscriber encoded data files with a set of publisher encoded data files.

20 Claims, 5 Drawing Sheets

(56) References Cited

OTHER PUBLICATIONS

R. Blanco, E. Bortnikov, F. Junqueira, R. Lempel, L. Telloli, and H. Zaragoza. Caching search engine results over incremental indices. In WWW, pp. 1065-1066, 2010.

A. Z. Broder, D. Carmel, M. Herscovici, A. Soffer, and J. Zien. Efficient query evaluation using a two-level retrieval process. In CIKM '03, pp. 426-434, New York, NY, USA, 2003. ACM.

C. Buckley and A. F. Lewit. Optimization of inverted vector searches. In SIGIR, pp. 97-110, 1985.

D. Carmel and E. Amitay. Juru at 2006: Taat versus daat in the terabyte track. In TREC, 2006.

A. Carzaniga and A. L. Wolf. Forwarding in a content-based network. In SIGCOMM'03, pp. 163-174, Karlsruhe, Germany, 2003. ACM.

Y. Diao, M. Altinel, M. J. Franklin, H. Zhang, and P. Fischer. Path sharing and predicate evaluation for high-performance xml filtering. TODS, 28:2003, 2003.

F. Fabret, H. A. Jacobsen, F. Llirbat, J. Pereira, K. A. Ross, and D. Shasha. Filtering algorithms and implementation for very fast publish/subscribe systems. In SIGMOD '01, pp. 115-126, New York, NY, USA, 2001. ACM.

R. Fagin, A. Lotem, and M. Naor. Optimal aggregation algorithms for middleware. In PODS, pp. 102-113, 2001.

P. Haghani, S. Michel, and K. Aberer. Evaluating top-k queries over incomplete data streams. In CIKM, pp. 877-886, 2009.

P. Haghani, S. Michel, and K. Aberer. The gist of everything new: personalized top-k processing over web 2.0 streams. In Proceedings of the 19th ACM international conference on Information and knowledge management, CIKM '10, pp. 489-498, 2010.

P. Lacour, C. Macdonald, and I. Ounis. Efficiency comparison of document matching techniques. In Efficiency Issues in Information Retrieval Workshop; European Conference for Information Retrieval, pp. 37-46, 2008.

A. Machanavajjhala, E. Vee, M. N. Garofalakis, and J. Shanmugasundaram. Scalable ranked publish/subscribe. PVLDB, 1(1):451-462, 2008.

K. Pripuzic, I. P. Zarko, and K. Aberer. Top-k/w publish/subscribe: finding k most relevant publications in sliding time window w. In DEBS, pp. 127-138, 2008.

A. C. Snoeren, K. Conley, and D. K. Gifford. Mesh-based content routing using xml. In SOSP. ACM, 2001.

T. Strohman, H. R. Turtle, and W. B. Croft. Optimization strategies for complex queries. In SIGIR, pp. 219-225, 2005.

H. R. Turtle and J. Flood. Query evaluation: Strategies and optimizations. Information Processing and Management, 31(6):831-850, 1995.

R. Weber, H.-J. Schek, and S. Blott. A quantitative analysis and performance study for similarity-search methods in high-dimensional spaces. In Proceedings of the 24rd International Conference on Very Large Data Bases, VLDB '98, pp. 194-205, San Francisco, CA, USA, 1998. Morgan Kaufmann Publishers Inc.

B. Yang and G. Jeh. Retroactive answering of search queries. In WWW, pp. 457-466, 2006.

J. Zobel and A. Moffat. Inverted files for text search engines. ACM Computing Surveys, 38(2), 2006.

\* cited by examiner

PUBLISH-SUBSCRIBE BASED METHODS AND APPARATUSES FOR ASSOCIATING DATA FILES

BACKGROUND

1. Field

The subject matter disclosed herein relates to data processing using one or more computing devices.

2. Information

Data processing tools and techniques continue to improve. Information in the form of encoded data signals is continually being generated or otherwise identified, collected, stored, shared, and analyzed. Databases and other like data repositories are common place, as are related communication networks and computing resources that provide access to such information.

The Internet is ubiquitous; the World Wide Web provided by the Internet continues to grow with new information seemingly being added every second. To provide access to such information, tools and services are often provided which allow for the copious amounts of information to be searched through in an efficient manner. For example, service providers may allow for users to search the World Wide Web or other like networks using search engines. Similar tools or services may allow for one or more databases or other like data repositories to be searched.

With so much information being available and often changing over time, there is a continuing need for methods and apparatuses that allow for certain information to be easily identified and monitored in an efficient manner.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Various example methods and apparatuses are provided herein which may be implemented using one or more computing platforms to associate subscriber encoded data files with publisher encoded data files based, at least in part, on content.

As described in greater detail herein, certain example publish-subscribe data processing techniques may be implemented to allow for published items (e.g., content from a set of publisher encoded data files) to be associated with, and possibly used in annotating subscriber content (e.g., in a subscriber encoded data). By way of example, in certain implementations, subscriber content may comprise informational story content, such as, e.g., news stories, reference information, announcements, advertisements, etc. It may be useful to associate subscriber content with content from published items that may be considered of relevance. Thus, for example, informational story content may be annotated using other relevant content, such as, e.g., micro-blog content (e.g., from a Twitter™ source), social network content (e.g., from a Facebook™ source), and/or other like services and/or applications which may be used in a networked computing environment.

While certain example implementations are disclosed herein using news stories as an example informational story content and Tweets from Twitter™ as an example micro-blog content, it should be kept in mind that claimed subject matter is not necessarily limited to such examples. Indeed, claimed subject matter is not necessarily limited to subscriber encoded data files that comprise informational story content and/or publisher encoded data files that comprise micro-blog content and/or social network content.

As such, in certain example implementations, a subscriber encoded data file and/or publisher encoded data file may comprise all or part of any type of content that may be represented by encoded data signals, e.g., as may be stored using a memory in an electronic device, a computer readable medium, or the like. For example, textual content, graphical content, image content, audio content, and/or other forms or combinations of forms of content may be encoded using various known encoding techniques. Thus, in certain example implementations, all or part of content in a subscriber encoded data file may be of the same or similar form, or of a different form, from all or part of content in a publisher encoded data file. While claimed subject matter is not necessarily limited, it may be useful, for example, to categorize or otherwise differentiate subscriber encoded data files from publisher encoded data files based, at least in part, on their respective sources, certain functions, and/or other like applicable parameters.

Figure 1:
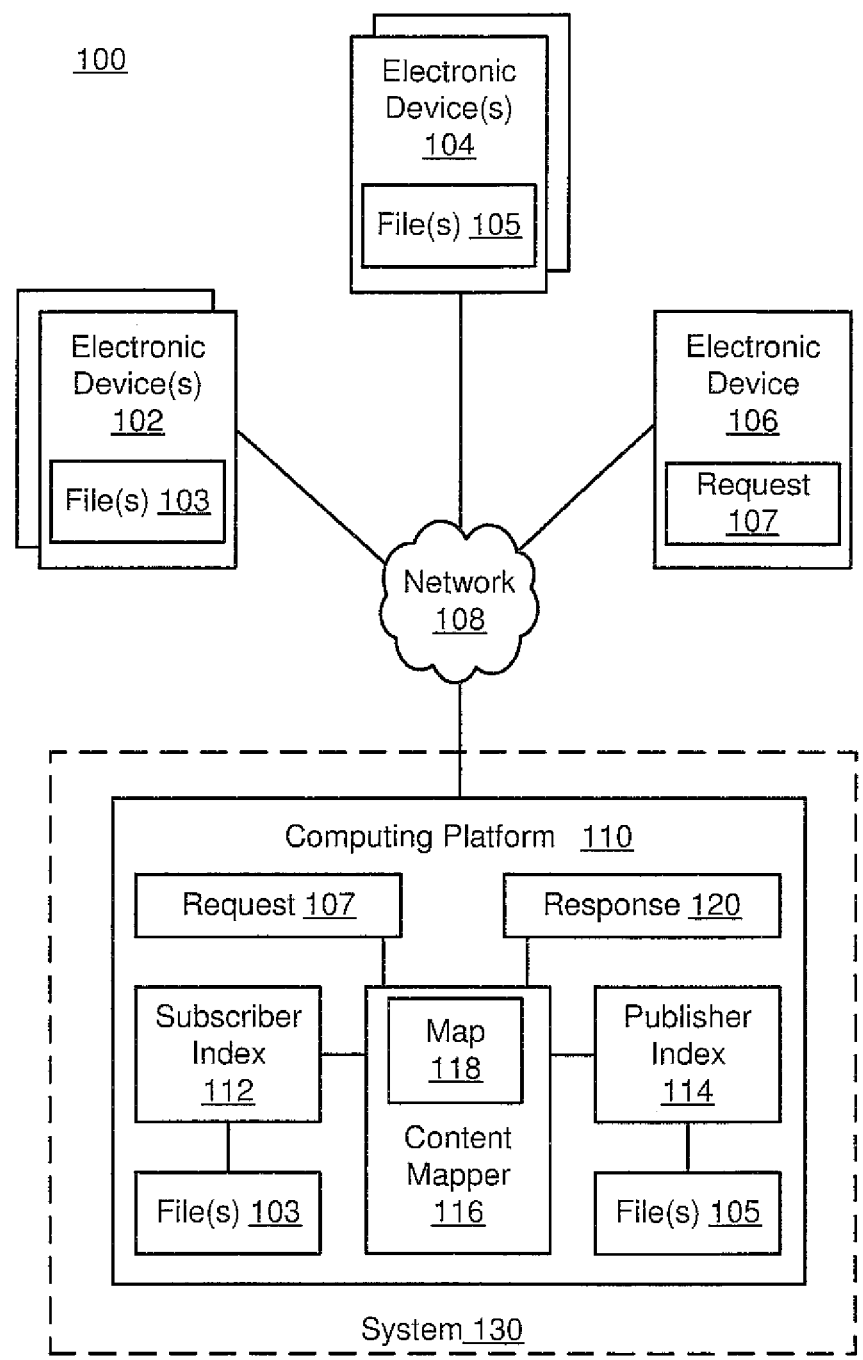
FIG. 1 is a schematic block diagram illustrating an example implementation of a networked computing environment comprising at least one computing platform for use in associating subscriber encoded data files with publisher encoded data files, in accordance with certain example implementations.

Attention is drawn to FIG. 1, which is a schematic block diagram illustrating an example implementation of a networked computing environment 100 comprising at least one computing platform 110 for use in associating subscriber encoded data files 103 with publisher encoded data files 105, in accordance with certain example implementations.

As illustrated, networked computing environment 100 may, for example, comprise one or more subscriber content source electronic devices 102 to provide subscriber encoded data files 103 to computing platform 110, e.g., via network 108. Networked computing environment 100 may, for example, further comprise one or more publisher content source electronic devices 104 to provide publisher encoded data files 105 to computing platform 110, e.g., via network 108. Networked computing environment 100 may, for example, further comprise a content requesting electronic device 106 to provide a content request 107 to computing platform 110, e.g., via network 108. Content requesting electronic device 106 may, for example, obtain a response 120 (e.g., to content request 107) from computing platform 110, e.g., via network 108.

In certain example implementations, electronic devices 102, 104, and/or 106 may represent a one or more computing platforms, one or more servers or server instances, a server farm, a cloud computing arrangement, etc. In certain example implementations, electronic devices 102, 104, and/or 106 may represent a portable electronic device, such as, e.g., a cell phone, a smart phone, a laptop computer, a tablet computer, etc.

Figure 2:
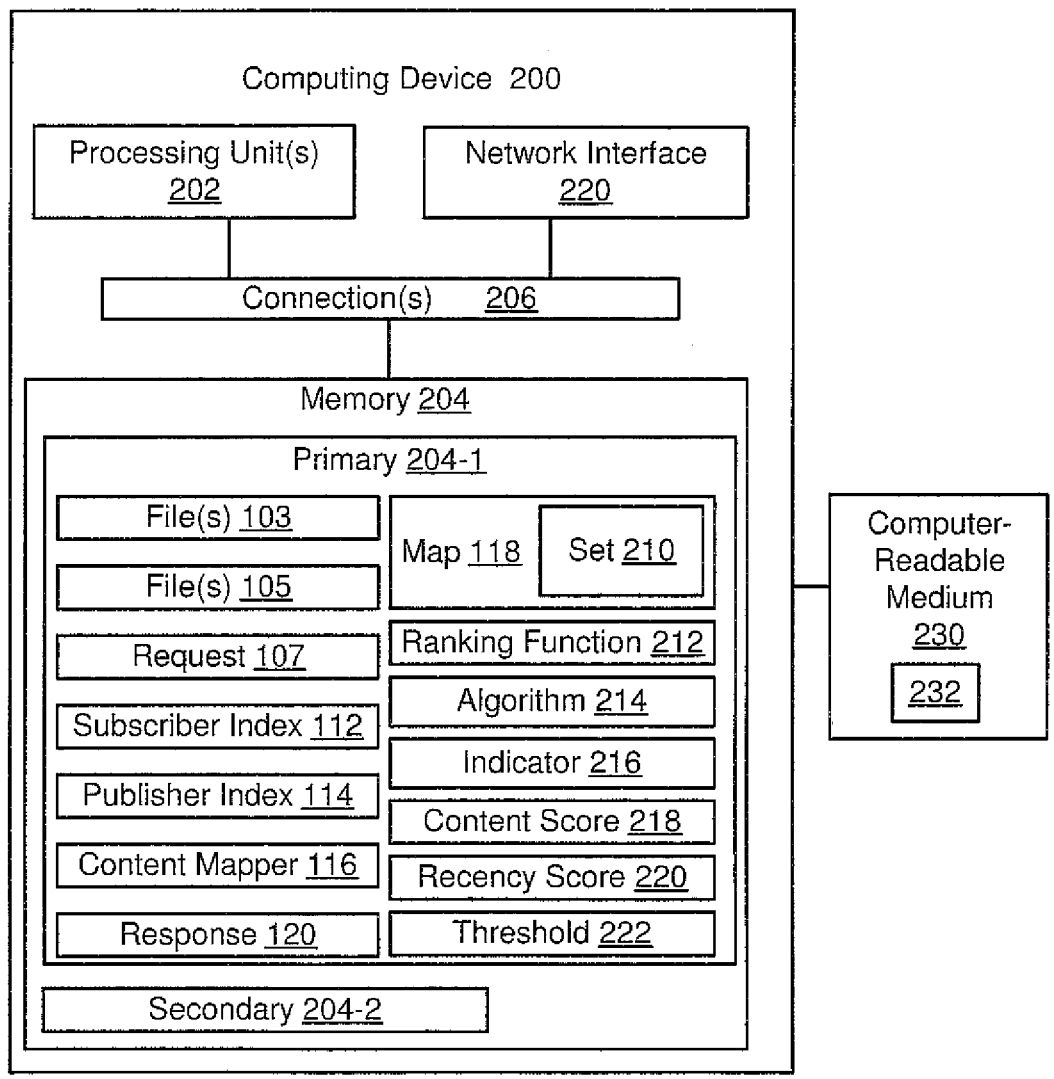
FIG. 2 is a schematic block diagram illustrating certain features of an example computing device that may be used in at least one computing platform for use in associating subscriber encoded data files with publisher encoded data files, in accordance with certain example implementations.

Computing platform 110 may, for example, represent one or more computing devices, which may or may not be similar to certain electronic devices 102, 104, and/or 106. FIG. 2 illustrates certain general features of a computing device 200 that may be implemented (in whole or part) in computing platform 110, and/or one or more of electronic devices 102, 104, and/or 106.

Although illustrated as being separate, in certain instances, electronic devices 102, 104, and/or 106 may represent the same computing device(s) and/or share certain computing and/or communication resources, or otherwise be co-located. In certain instances, one or more of electronic devices 102, 104, and/or 106 may represent the same computing device(s) as computing platform and/or share certain computing and/or communication resources, or otherwise be co-located therewith.

As illustrated in an example in FIG. 1, electronic devices 102, 104, 106 and computing platform 110 may be operatively coupled together via one or more networks or other like data signal communication technologies, which may be represented using network 108. Thus, for example, network 108 may comprise one or more wired or wireless telecommunication systems or networks, one or more local area networks or the like, an intranet, the Internet, etc.

In certain example implementations, computing platform 110 may be implemented as part of a system 130. For example, in certain instances system 130 may comprise or otherwise operatively support all or part of an information retrieval (IR) system, a database system, a social network service system, a micro-blogging service system, an electronic mail service system, an information story content dissemination service system, and/or the like.

As further illustrated in FIG. 1, example computing platform 110 may comprise a subscriber index 112, a publisher index 114, a content mapper 116, and a content map 118; each of which is described in greater detail herein. Subscriber index 112 may, for example, be maintained (established, updated, etc.) for a plurality of subscriber encoded data files 103. Publisher index 114 may, for example, be maintained (established, updated, etc.) for a plurality of publisher encoded data files 105. In certain example implementations, content mapper 116 may maintain subscriber index 112 based on subscriber encoded data files 103 obtained via network 108, and publisher index 114 based on publisher encoded data files 105 obtained via network 108. In certain example implementations, content mapper 116 may maintain content map 118 based, at least in part, on one or more of subscriber index 112, publisher index 114, subscriber encoded data files 103, and/or publisher encoded data files 105.

In certain example implementations, content mapper 116 may establish response 120 based, at least in part, on content request 107 and content map 118. For example, content request 107 may identify a particular subscriber encoded data file and content map 118 may identify an associated set of publisher encoded data files, e.g., which may be used annotating the particular subscriber encoded data file.

By way of example, a content request 107 may identify a particular news story (e.g., a subscriber encoded data file in subscriber index 112), and content map 118 may identify a set of Tweets (e.g., publisher encoded data files in publisher index 114) which have been determined by content mapper 116 to be of possible relevance to the particular news story. For example, a set of top-k ranked Tweets may be identified in content map 118 (e.g., ranked based on indications of content relevancy with regard to a new story) and which may be used in annotating the particular news story, where k may be an integer. Thus, for example, if k=5 then response 120 may identify (e.g., by name, location, inclusion, etc.) up to five Tweets (e.g., publisher encoded data files) to electronic device 106, via network 108. Of course, as with all of the examples provided herein, claimed subject matter is not necessarily so limited.

Reference is made next to FIG. 2, which is a schematic block diagram illustrating certain features of an example electronic device 200 that may be used in computing platform 110 (FIG. 1) for use in associating subscriber encoded data files 103 with publisher encoded data files 105, in accordance with certain example implementations.

Computing device 200 may, for example, include one or more processing units 202, memory 204, one or more connections 206, and a network interface 220.

Processing unit 202 is representative of one or more circuits configurable to perform at least a portion of a data signal computing procedure or process. For example, processing unit 202 may perform at least a portion of a data signal computing procedure or process associated with one or more of content mapper 116, content map 118, a set 210 of publisher encoded data files 105, subscriber index 112, publisher index 114, response 120, etc., e.g., as illustrated within memory 204. By way of example but not limitation, processing unit 202 may include one or more processors, controllers, microprocessors, microcontrollers, application specific integrated circuits, digital signal processors, programmable logic devices, field programmable gate arrays, and the like, or any combination thereof.

Memory 204 is representative of any data storage mechanism. Memory 204 may include, for example, a primary memory 204-1 or a secondary memory 204-2. Primary memory 204-1 may include, for example, a solid state memory such as a random access memory, read only memory, etc. While illustrated in this example as being separate from processing unit 202, it should be understood that all or part of primary memory 204-1 may be provided within or otherwise co-located/coupled with processing unit 202.

Figure 3:
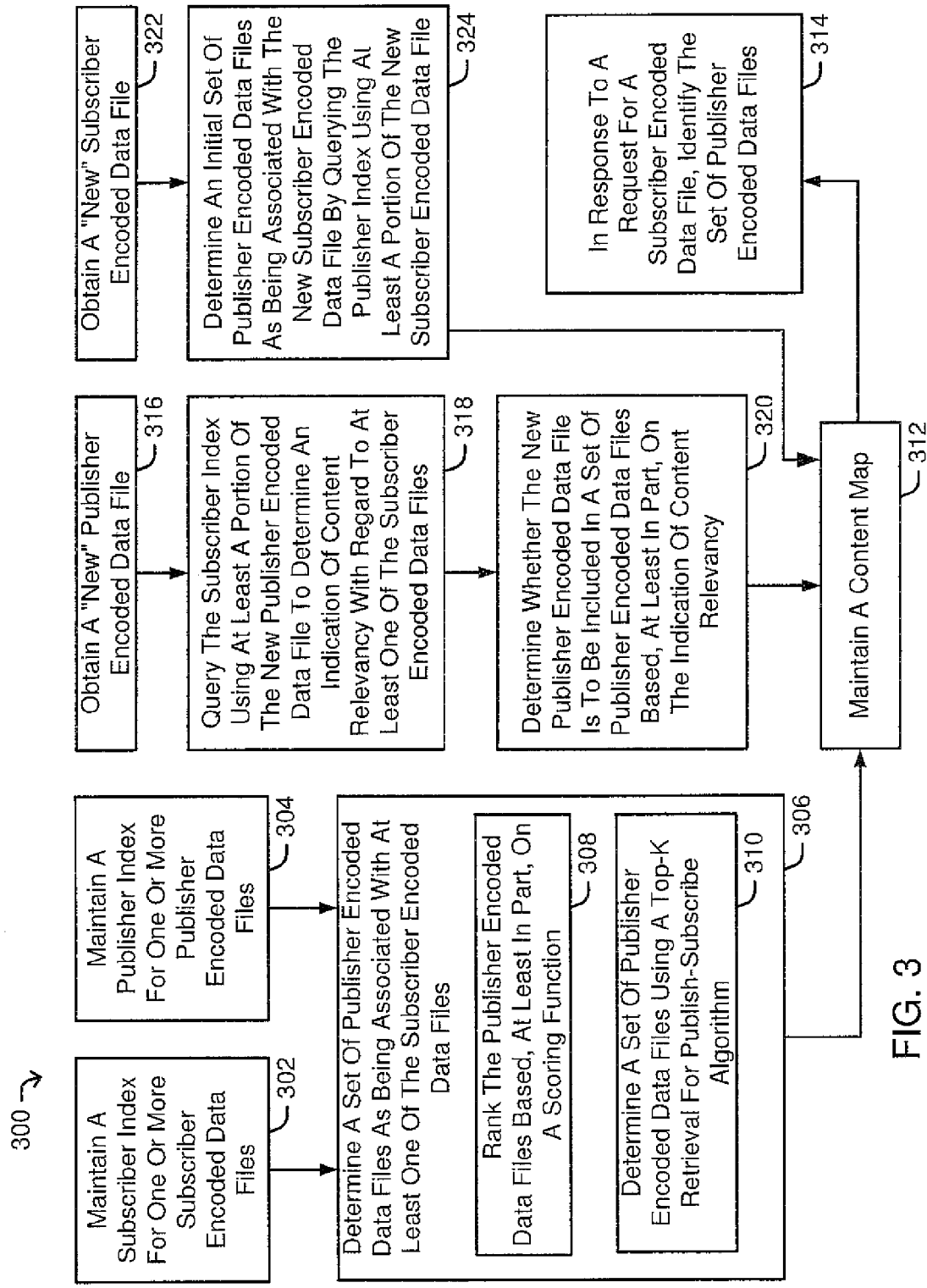
FIG. 3 is a flow diagram illustrating a process implementable in at least one computing platform for use in associating subscriber encoded data files with publisher encoded data files, in accordance with certain example implementations.

Secondary memory 204-2 may include, for example, a same or similar type of memory as primary memory or one or more data storage devices or systems, such as, for example, a disk drive, an optical disc drive, a tape drive, a solid state memory drive, etc. In certain implementations, secondary memory 204-2 may be operatively receptive of, or otherwise configurable to couple to, a computer-readable medium 230. Computer-readable medium 203 may include, for example, any non-transitory media that can carry or make accessible data, code or instructions 232 for use, at least in part, by processing unit 202 or other circuitry within computing device 200. Thus, in certain example implementations, instructions 212 may be executable to perform one or more functions of computing platform 110 (FIG. 1) and/or process 300 (FIG. 3).

Network interface 220 may, for example, provide for or otherwise support an operative coupling of computing device 200 to network 108 or possibly more directly with one or more of electronic device(s) 102, 104, and/or 106. By way of example, network interface 220 may comprise a network interface device or card, a modem, a router, a switch, a transceiver, and/or the like.

Connection(s) 206 may represent any connection(s) which may operatively couple the illustrated features in FIG. 2. By way of way of example, connection(s) 206 may comprise one or more electrically or optically conductive data signal paths, one or more data buses, one or more coupling circuits and/or devices, etc.

As illustrated in FIG. 2, at times, memory 204 may store one or more data signals representing data and/or instructions associated with processing unit(s) 202, network interface 220, and/or computer-readable medium 230. For example, all or part of one or more subscriber encoded data files 103, and/or all or part of one or more publisher encoded data files 105 may be stored or otherwise identified in memory 204. For example, all or part of one or more content requests 107, and/or all or part of one or more responses 120 may be stored or otherwise identified in memory 204. For example, a subscriber index 112 and/or a publisher index 114 may be stored in memory 204.

For example, data and/or instructions for content mapper 116, map 118, and set 210, may be stored or otherwise identified in memory 204. For example, data and/or instructions for one or more ranking functions 212, and/or algorithms 214 may be stored or otherwise identified in memory 204.

One or more indicators 216 may be stored in memory 204, and which may represent indications of content relevancy for certain publisher encoded data files with regard to a subscriber encoded data file. For example, a content score 218 and/or recency score 220 may be stored in memory 204. In certain instances, a threshold 222 (e.g., a value) relating to a set 210 of publisher encoded data files 105 may be stored in memory 204.

Attention is now drawn to FIG. 3, which is a flow diagram illustrating a process 300 implementable in at least one computing platform for use in associating subscriber encoded data files with publisher encoded data files, in accordance with certain example implementations.

At example block 302, a subscriber index may be maintained for one or more subscriber encoded data files. At example block 304, a publisher index may be maintained for one or more publisher encoded data files.

At example block 306, for at least one of the subscriber encoded data files in the subscriber index, a corresponding set of publisher encoded data files from the publisher index may be determined as being associated with the subscriber encoded data file. For example, in certain instances, at block 308, publisher encoded data files may be ranked based, at least in part, on at least one scoring function. Some example scoring functions are described in greater detail in subsequently sections herein. In certain example implementations, at block 310, a set of publisher encoded data files may be determined, at least in part, using a top-k retrieval for publish-subscribe algorithm. By way of example, as described with some examples implementations in subsequent sections, a term-at-a-time (TAAT) for publish-subscribe algorithm, and/or a skipping TAAT for publish-subscribe algorithm may be used, at least in part, to determine a set of publisher encoded data files at block 310. In certain other example implementations, as described in subsequent sections, a document-at-a-time (DAAT) for publish-subscribe algorithm, and/or a skipping DAAT for publish-subscribe algorithm may be used, at least in part, to determine a set of publisher encoded data files at block 310.

At example block 312, a content map may be maintained, e.g., to identify a current set of publisher encoded data files from the publisher index that have been determined to be associated with a particular subscriber encoded data file. In certain example instances, a "set" may comprise a top-k or other limited number of publisher encoded data files from the publisher index. In certain example, instances, a "set" may, at times, comprise an empty set, e.g., if no publisher encoded data files from the publisher index have been determined to be associated with a given subscriber encoded data file.

At example block 314, in response to a content request for a particular subscriber encoded data file, a current set of publisher encoded data files from the publisher index that have been determined to be associated with a particular subscriber encoded data file (e.g., from content map), may be identified, for example, as part of a response to content request.

At example block 316, a "new" publisher encoded data file may be obtained. At example block 318, a subscriber index may be queried using at least a portion of content in the new publisher encoded data file to determine an indication of content relevancy of the new publisher encoded data file with regard to at least one subscriber encoded data file in the subscriber index. Although not shown, in certain example implementations, example block 318 may comprise all or part of example block 306. At example block 320, a determination may be made as to whether a new publisher encoded data file is to be included in a set of publisher encoded data files based, at least in part, on an indication of content relevancy. At example block 312, a content map may be updated based on a determination at block 320. For example, one or more sets of publisher encoded data files for one or more subscriber encoded data files may be affected by a new publisher encoded data file in accordance with a determination at block 320.

At example block 322, a "new" subscriber encoded data file may be obtained. At example block 324, an initial set of publisher encoded data files may be determined as being associated with the new subscriber encoded data file, e.g., by querying a publisher index using at least a portion of content in the new subscriber encoded data file. Although not shown, in certain example implementations, example block 324 may comprise all or part of example block 306. At example block 312, a content map may be updated based on a determination at block 324. For example, an initial set of publisher encoded data files for a new subscriber encoded data file may be established in a content map in accordance with a determination at block 320.

Figure 4:
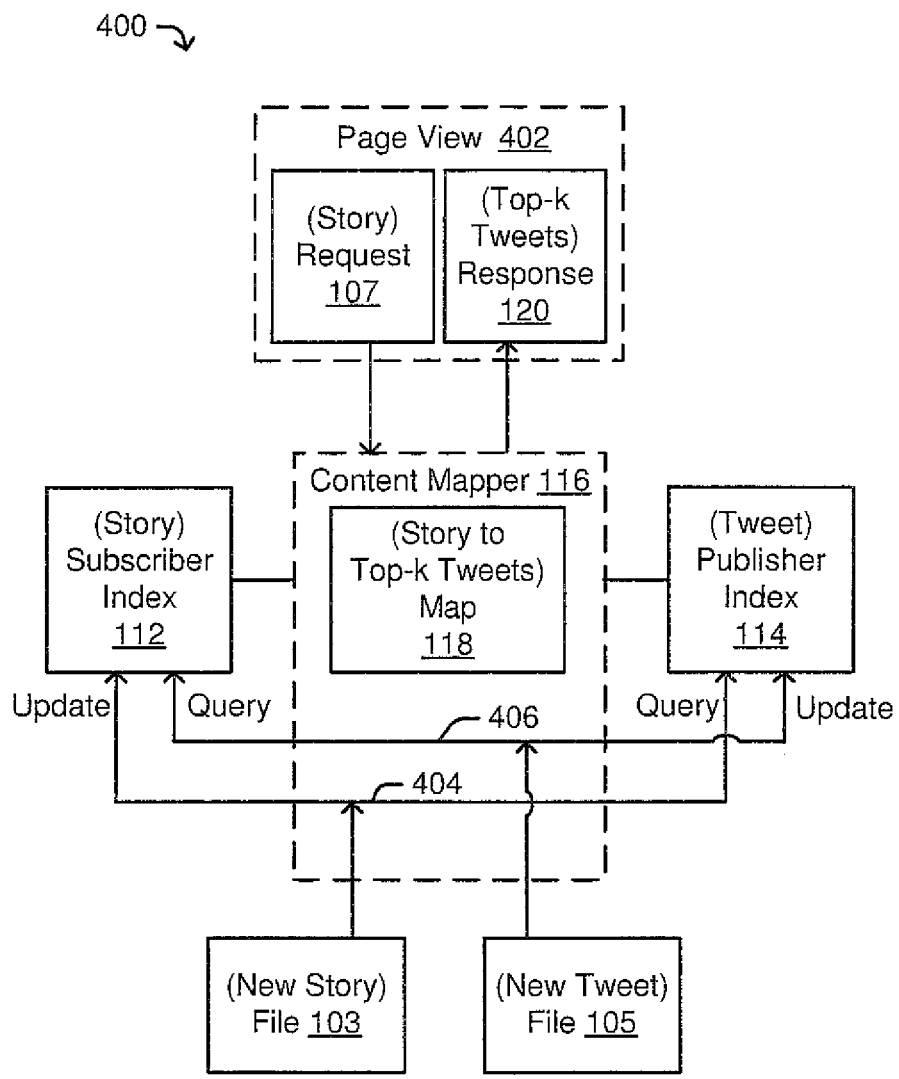
FIG. 4 is a schematic block diagram illustrating certain features of an example computing platform, e.g., as in FIG. 1, for use in associating subscriber encoded data files with publisher encoded data files, wherein the subscriber encoded data files comprises an example informational story content and the publisher encoded data files comprise an example micro-blog content, in accordance with certain further example implementations.

Reference will be made next to FIG. 4, which is a schematic block diagram illustrating certain features of an example computing platform, e.g., as in FIG. 1, for use in associating subscriber encoded data files with publisher encoded data files, e.g., as in FIG. 3, wherein the example subscriber encoded data files comprise informational story content in the form of news stories and the publisher encoded data files comprise micro-blog content in the form of Tweets (e.g., Twitter™ updates), in accordance with certain further example implementations. As with all of the examples provided herein, claimed subject matter is not necessarily limited to any of the example implementations.

Before addressing FIG. 4 in detail, it may be instructive to first review an example schema wherein it may prove beneficial to annotate new stories available via the Internet with recently Tweeted content.

Social content, such as Twitter™ updates (Tweets), may provide first-hand reports of news events, as well as numerous commentaries that are indicative of a public view of such events. As such, social updates may provide a good complement to other news stories. However, it may be difficult to annotate certain news stories with social updates (Tweets), at a news website serving a high volume of page views. For example, there may be a significantly high rate of both the page views (e.g., millions to billions a day) and of incoming Tweets (e.g., more than 100 millions a day), which may make even near real-time indexing of Tweets ineffective, as traditional techniques may require the use of an index that is both queried and updated extremely frequently. Moreover, a likely rate of Tweet updates may render traditional caching techniques almost unusable since a cache would likely become stale very quickly.

As presented herein, example methods and apparatuses may be implemented in which each news story may be treated as a subscription for Tweets which may be relevant to a story's content. As described herein, certain example algorithms may be implemented that may more efficiently associate (e.g., match) Tweets to stories, e.g., to proactively maintain a set of top-k Tweets for an applicable story. It is believed that certain example algorithms may be implemented in a manner which tends to consume only a small fraction of a computing resource cost of certain traditional solutions. Furthermore, it is believed that certain example algorithms may be applicable to other large scale content-based publish-subscribe situations.

Micro-blogging services such as, e.g., those provided by Twitter™ and other service providers, may be a useful part of a news consumption experience on the World Wide Web, and/or other networks. With over 100 million reported users, Twitter™ often provides some of the quickest first-hand reports of news events, as well as numerous commentaries that may be indicative of certain views of news events. As such, there appears to be a desire to combine traditional and social news content through annotation, e.g., annotating news stories with related micro-blogs, such as, Twitter™ updates (Tweets).

However, there may be several technical difficulties in building an efficient system for such social news annotation. One of the challenges is that Tweets may arrive in very high volume, e.g., more than 100 million per day. As recency may be one of the indicators of relevance for Tweets, news stories may be improved if annotated quickly, e.g., in near real time. Furthermore, large news websites may have significantly high numbers of page views which may provide for a better user experience if served with low latency (e.g., fractions of a second). In this context it may be that a system may receive hundreds of millions to billions of content requests in a day. Also, there may be a non-trivial number of unique stories to consider annotating, e.g., possibly ranging in hundreds of thousands.

In accordance with certain aspects of the present description, example top-k publish-subscribe approaches may be adapted and implemented which may efficiently associate news stories with social content, possibly in near real-time. To be able to cope with a high volume of updates (Tweets) and story content requests, the techniques presented by way of examples herein may use news stories as subscriptions, and Tweets as published items in a publish-subscribe approach.

In certain traditional publish-subscribe approaches published items trigger subscriptions when they match a subscription's predicate. In certain example top-k publish-subscribe approaches provided herein each subscription (story) scores published items (Tweets), for example, based on a content overlap between the story and the Tweets. A subscription may, for example, be triggered by a new published item if the item scores higher than a k-th top scored item (threshold), e.g., previously published (determined) for this specific subscription. In certain example top-k publish-subscribe approaches provided herein, a ranked set of published items may be provided for each subscription as opposed to a ranked list of subscriptions for a given item.

By way of example, a current result set of top-k items may be maintained for each story, e.g., in a content map which may reduce a story serving cost to an in-memory table lookup made to fetch an applicable set. As such, in certain example implementations, on an arrival of a "new" Tweet, a process may be implemented (e.g., possibly in the background) to identify stories that the new Tweet is related to, and to adjust their result sets accordingly. An example process was illustrated in FIG. 3 which maintained a content map in similar fashion.

In certain example top-k publish-subscribe approaches provided herein, news annotation may be more feasible from efficiency standpoint using certain scoring functions. Some example scoring functions are described in detail below, however, it should be recognized that various other techniques may be employed or adapted for use in other implementations. For example, it is believed that language model scoring techniques and/or the like may be employed.

Certain example top-k publish-subscribe approaches provided herein may be particularly suitable for high volume updates and requests more than a traditional "pull" approach, where Tweets may be indexed using real-time indexing and news page view requests may be issued as queries at serving time.

Additionally, certain example top-k publish-subscribe approaches provided herein may be applicable to other publish-subscribe scenarios beyond news annotation with Tweets. For example, certain example top-k publish-subscribe approaches provided herein may be applicable where subscriptions are triggered not only based on a predicate match, but also on their relationship with previously considered items. Some examples may include content-based RSS feed subscriptions, systems for combining editorial and user generated content under high query volume, updating cached results of "head" queries in a search engine, to name just a few. Even in cases where a stream of published items may not be as high as in the case of Twitter™, certain example top-k publish-subscribe approaches provided herein may offer a lower serving cost since processing may be done on arrival of published items, while at query time a pre-computed result may be quickly obtained from memory. Another potential advantage to certain example top-k publish-subscribe approaches provided herein may be that matching may occur "off-line", e.g., and possibly using various complex matching algorithm(s) and/or function(s).

In certain example top-k publish-subscribe approaches provided herein certain example document-at-a-time (DAAT) and/or term-at-a-time (TAAT) algorithms may be adapted to support a publish-subscribe setting. Moreover, it is believed that with certain adaptations (e.g., skipping) provided in some example top-k publish-subscribe algorithms, further significant reductions in processing time may be provided. For example, it appears that a reduction in processing time may be provided by maintaining "threshold" scores which new Tweets would need to exceed in order to be included in current result sets of stories. Thus, for example, if an upper bound on a Tweet's relevancy score appears to be below a threshold, then it may be possible skip a full computation of Story-Tweet score. Hence, score computation may be part of a processing cost and thus by skipping a significant fraction of score computations it may be possible to reduce processing resource usage and/or processing time of an incoming Tweet accordingly. Thus, in accordance with certain aspects, maintaining thresholds for ranges of stories may allow for certain DAAT and/or TAAT skipping adaptations which may provide a significant reduction in processing latency.

In certain example top-k publish-subscribe approaches provided herein, subscriptions may be triggered based on a score assigned to published items and their relationship with previous items. Thus, as shown by some detailed examples below, a top-k publish-subscribe paradigm may be used for associating news stories with Tweets (possibly in near real time) by indexing news stories as subscriptions and processing Tweets as published items, allowing for much lower cost of serving.

By way of example, let us consider a news website serving a collection S of news stories. A story served at time t may be associated with a set of k most relevant social updates (Tweets) received up to time t. Formally, given a set $U^t$ of updates at serving time t, story s may be associated with a set of top-k updates $R_s^t$ (note, superscripts t are omitted when clear from the context) according to the following scoring function:

$$score(s,u,t)=cs(s,u)\cdot rs(t,t_u),$$

where cs is a content-based score function, rs is a recency score function, and $t_u$ is a creation time of update u. In this example, let us assume that cs may be from a family of IR scoring functions, such as, e.g., a cosine similarity or a BM25, and rs to monotonically decrease with $t-t_u$, e.g., at the same rate for all Tweets. Thus, one may determine that a Tweet u may be related (e.g., be relevant) to story s if cs(s, u)>0.

Let us consider an example content-based score function, based on two popular IR relevance functions: cosine similarity and BM25. Let us adopt a variant of cosine similarity similar to the one used in the open-source Lucene search engine $$cs(s,u) = \sum_i u_i \cdot idf^2(i) \cdot \sqrt{\frac{s_i}{|s|}},$$

where $s_i$ (resp. $u_i$) is a frequency of term i in a content of s (resp. u), |s| is a length of S, and $$idf(i) = 1 + \log\left(\frac{|S|}{1 + |\{s \in S \mid s_i > 0\}|}\right)$$

is an inverse document frequency of i in S. With slight adjustment in notation one may refer to a score contribution of an individual term by $cs(s; u_i)$, e.g., in the above function $$cs(s, u_i) = u_i \cdot idf^2(i) \cdot \sqrt{\frac{s_i}{|s|}}.$$

An example BM25 content-based score function may defined as follows:

$$cs(s,u) = \sum_i u_i \cdot idf(i) \cdot \frac{s_i \cdot (k_1 + 1)}{s_i + k_1 \cdot \left(1 - b + b \cdot \frac{|s|}{avg_{s \in S}|s|}\right)},$$

where $k_1$ and b are parameters of a function (e.g., in some examples may be $k_1=2$; b=0.75).

While these example content-based score functions may be considered by some to be simplistic scoring functions, they are based on query-document overlap and may be implemented as dot products similarly to other popular scoring functions, and may therefore incur similar runtime costs. In certain instances, it may be beneficial to employ multiple or more complex content-based score functions. For example, it may be useful in certain implementations to employ scoring functions that may be used in first phase retrieval, after which a second phase may employ a more elaborate scoring function to produce a final ordering of results.

Let us now consider an example recency score. As mentioned, Tweets are often tied (explicitly or implicitly) to some specific event, and content relevance to current events may decline as time passes. In accordance with certain aspects, it is believed that in certain implementations, one may therefore discount scores of older Tweets by some factor. By way of example, in certain implementations scores of Tweets may be discounted by a factor of two every time-interval τ (a parameter). By way of example, one may use an exponentially decaying recency score:

$$rs(t_u, t) = 2^{\frac{t_u-t}{\tau}}.$$

In certain example implementations, a monotonically decreasing function may be used.

Let us now consider an example top-k publish-subscribe approach that may provide for a scalable solution while keeping page view processing costs low. As previously illustrated, one potential way to keep page view processing costs low may be to maintain a content map indicating a current set of Tweets that may be used in annotating a story. Let $R_s$ be a set of current top-k Tweets for a story sϵS (e.g., at time t, comprising the top-k Tweets from u'). For each "new" Tweet one may identify stories that a new Tweet may annotate, and may include the new Tweet to applicable stories' result sets. On page views (e.g., in response to a contest request), a precomputed annotations $R_s$ may be accessed directly and/or with only minor additional processing overhead.

Attention is now directed to FIG. 4, which illustrates certain features of an example top-k publish-subscribe system 400 for new stories and Tweets. FIG. 4 is similar to FIG. 1. and as such may be implemented in one or more computing devices in one or more computing platforms 110.

As illustrated, a complementary Tweet Index 114 may be maintained and used to initialize annotations of new stories 103 that are being added to the system. A story Index 112 may also be provided to index stories in S. A content mapper 116 may be used for example to maintain Story Index 112 and Tweet Index 114. As represented by line 406, content mapper 116 may also query Story Index 112 using a "new" Tweet 105. Content mapper 116 may also update a current top-k Tweets $R_s$ for each story, as applicable.

Similar to example process 300 (FIG. 3), example top-k publish-subscribe system 400 may: (1) handle a "new" story by querying Tweet Index 114 (e.g., as represented by line 404) and retrieving the top-k Tweets, which may be used to initialize $R_s$; (2) handle a new Tweet 105 by querying story Index 112 and, for every story s, if the new Tweet is part of a top-k results for s, may include the new Tweet in $R_s$; (3) in response to a content request (e.g., as part of a page view 402), identify the top-k set of Tweets $R_s$. In this example, the top-k set of Tweets $R_s$ may be maintained by content mapper 116 in a story to top-k Tweets content map 118.

Accordingly, in this example, Story Index 112 may be queried frequently, but updated infrequently, while Tweet Index 114 may be updated more frequently but queried only for new stories which may be orders of magnitude less frequent than the number of Tweet updates. Additionally, in this example, page views, which may be the most frequent event, may be served very efficiently by response 120 returning pre-computed set of Tweets $R_s$, e.g., as identified in map 118.

Let us now further consider an example subscriber index (e.g., Story Index 112). As mentioned, Story Index 112 may be used to index stories instead of Tweets, and to run Tweets as queries on that index. Inverted indices may be one of the most popular data structures for information retrieval. For example, with an inverted index, subscriber content of documents (new stories in the example of FIG. 4) may be indexed in an inverted index structure, which may be a collection of posting lists $L_1, L_2, \ldots /L_m$, e.g., corresponding to terms (or, more generally, features) in the story corpus. A list $L_i$ may, for example, comprise postings of a form $\langle s, ps(s, i) \rangle$ for each story that contains term i, where s may be a story identifier and $$ps(s, i) = \frac{cs(s, u_i)}{u_i}$$

may be a partial score—a score contribution of term i to a full score $cs(s,\bullet)$. For example, for cosine similarity, $$ps(s, i) = idf^2 \cdot \sqrt{\frac{s_i}{|s|}}.$$

A factor $u_i$ may multiply a partial score at an evaluation time giving $cs(s,u_i)$. Thus, given a query using a published item (e.g., Tweet) u, a scoring function cs, and k, an example IR retrieval algorithm, shown in example conventional Algorithm 1 (below), traverses an inverted index of a corpus S and returns a top-k stories for u, that is, stories in S with a highest value of cs(s,u).

---
Algorithm 1 Generic conventional IR top-k retrieval algorithm
---
1: Input: Index of S
2: Input: Query u
3: Input: Number of results k
4: Output: R - min-heap of size k
5: Let $L_1, L_2, \ldots, L_{|u|}$ be the posting lists of terms in u
6: R ← ∅;
7: for every story s ∈ $\cup L_i$ do
8:     Attempt inserting (s; cs(s, u)) into R
9: return R
---

Note that the above described semantics may be different from what one may want to achieve, especially in a news story—Tweet example. For example, as mentioned, one may not want to find the top-k stories for a given Tweet, but rather all stories for which a Tweet is among the top-k Tweets. This difference may therefore preclude using off-the-shelf retrieval algorithms.

Consider instead, example Algorithm 2 (below) which shows top-k publish-subscribe semantics. In this example, given a Tweet u and current top-k sets for all stories $R_{s_1}, R_{s_2}, \ldots, R_{s_n}$, a new Tweet u may be included into result sets for which u ranks among the top-k matching Tweets. Note that in this example, we ignore a recency score rs.

---
Algorithm 2 Example adapted publish-subscribe based algorithm
---
1: Input: Index of S
2: Input: Query u
3: Input: $R_{s_1}, R_{s_2}, \ldots, R_{s_n}$ —min-heaps of size k for all stories in S
4: Output: Updated min-heaps $R_{s_1}, R_{s_2}, \ldots, R_{s_n}$
5: Let $L_1, L_2, \ldots, L_{|u|}$ be the posting lists of terms in u
6: for every story s ∈ $\cup L_i$ do
7:     Attempt inserting (u; cs(s, u)) into $R_s$
8: return $R_{s_1}, R_{s_2}, \ldots, R_{s_n}$
---

Let us now further consider the use of an example recency function in scoring. Recall that an example recency score function $$rs(t_u, t) = 2^{\frac{t_u - t}{\tau}},$$

may decay exponentially with a time gap between a creation time of Tweet $t_u$ and a page view time t. Accordingly, it may be generally observed that, as t grows, a relative ranking between scores of past Tweets may not change. Hence, one may not need to re-compute scores and re-rank Tweets in $R_s$ between updates caused by new Tweets. However, it might seem that whenever one attempts to insert a new Tweet into $R_s$, one may have to re-compute scores of Tweets that are already in $R_s$ in order to be able to compare these scores to the score of the new Tweet. Fortunately, this re-computation may be avoided by considering a recency score as $$rs(t_u, t) = \frac{2^{t_u/\tau}}{2^{t/\tau}},$$

and noting that the denominator $2^{t/\tau}$ depends only on a current time t, and at any given time is equal for all Tweets and all stories. Thus, if we do not use absolute score values beyond relative ranking of Tweets, we can replace $2^{t/\tau}$ with a constant=1, leading to the following example recency function:

$$rs(t_u) = 2^{t_u/\tau}.$$

The above example recency function depends on a creation time of a Tweet and thus may not have to be recomputed later as one attempts to insert new Tweets. In certain instances, however, if scores may grow exponentially as new Tweets arrive, the scores may grow beyond available numerical precision, in which case a pass over all Tweets in all $R_s$ may be preformed, subtracting a constant from all values of $t_u$ and re-computing the scores.

To detach accounting for a recency score from a retrieval algorithm, as a new Tweet arrives one may compute its $rs(t_u)$ and use $rs(t_u)$ as a multiplier of term weights in a Tweet's query vector u, e.g., one may use $2^{t_u/\tau} \cdot u$ to query an inverted Story Index. In computing a Tweet's content based score cs with a query vector, one may get a desired example final score:

$$cs(s, 2^{t_u/\tau} \cdot u) = \sum_i 2^{t_u/\tau} \cdot cs(s, u_i) = 2^{t_u/\tau} \cdot cs(s, u) = \text{score}(s, u, t).$$

Let us now consider some example retrieval algorithms for certain top-k publish-subscribe approaches. In this section it can be seen that certain adaptations may be made to known top-k retrieval techniques to allow for their use in an example publish-subscribe setting.

With this in mind, let us first consider an example implementation of a publish-subscribe retrieval algorithm (Algorithm 2) using a term-at-a-time (TAAT) strategy. One may refer to this example as a TAAT for publish-subscribe algorithm.

In term-at-a-time algorithms, posting lists corresponding to query terms may be processed sequentially, while accumulating partial scores of all documents encountered in the lists. After traversing all the lists, accumulated scores may be equal to a full query-document scores (cs(s,u)); documents that did not appear in any of the posting lists may have a zero score.

A top-k retrieval algorithm may then pick k documents with highest accumulated scores and return them as query result. In the present example setting, where a query may be a Tweet and documents may be stories, a new Tweet u may end up being added to $R_s$ of any story s for which score(s, u, t)>0. Thus, instead of picking the top-k stories with highest scores, we attempt to add u into $R_s$ of all stories having positive accumulated score, as shown in Algorithm 3 (below), where $\mu_s$ denotes a threshold score of a Tweet in $R_s$ (recall that $u_i$ denotes a term weight of term i in Tweet u).

---
Algorithm 3 Example TAAT for publish-subscribe algorithm

1: Input: Index of S
2: Input: Query u
3: Input: $R_{s_1}, R_{s_2},..., R_{s_n}$ —min-heaps of size k for all stories in S
4: Output: Updated min-heaps $R_{s_1}, R_{s_2},..., R_{s_n}$
5: Let $L_1, L_2,..., L_{|u|}$ be the posting lists of terms in u, in the descending order of their maximal score
6: A[s] ← 0 for all s — Accumulators vector
7: for i ∈ [1, 2,..., |u|] do
8:    for(s, ps(s,i)) ∈ $L_i$ do
9:       A[s] ← A[s] + $u_i$ · ps(s,i)
10: for every s such that A[s] > 0 do
11:    $\mu_s$ ← min. score of a Tweet in $R_s$ if $|R_s|$ = k, 0 otherwise
12:    if $\mu_s$ < A[s] T s < A[s] then
13:       if $|R_s|$ = k, then
14:          Remove the least scored Tweet from $R_s$
15:       Add (u, A[s]) to $R_s$
16: return $R_{s_1}, R_{s_2},..., R_{s_n}$

---

Next, let us first consider an example implementation of an adapted publish-subscribe retrieval algorithm (e.g., Algorithm 2) using a term-at-a-time (TAAT) strategy with skipping. One may refer to this example as a skipping TAAT for publish-subscribe algorithm.

An optimization often implemented in retrieval algorithms is skipping some postings or entire posting lists when scores computed so far indicate that no documents in a skipped postings may make it into a result set. For example, let $ms(L_i)$=max, ps(s, i) be a maximal partial score in list $L_i$. An example known algorithm may sort posting lists in a descending order of their maximal score, and process them sequentially until either exhausting all lists or satisfying an early-termination condition, in which case remaining lists may be skipped and a current top-k results may be returned. An early-termination condition may ensure that no documents other than a current top-k may make it into a true top-k result of a query. This condition may, for example, be satisfied if a k-th highest accumulated score is greater than an upper bound on the scores of other documents that are currently not among the top-k ones, calculated as a (k+1)-th highest accumulated score plus the sum of maximal scores of the remaining lists. Thus, let a next list to be evaluated be $L_i$, and denote by $A_k$ a k-th highest accumulated score. Then, lists $L_i, L_{i+1}, \ldots, L_{|u|}$ may be safely skipped if $$A_k > A_{k+1} + \sum_{j \geq i} u_j \cdot ms(L_j).$$

With this in mind, in our example setting, since we are not be interested in top-k stories but rather top-k Tweets for each story, we cannot use the above condition and have instead developed a different condition suitable to our example. In order to skip list $L_i$, we may make sure that Tweet u does not make it into $R_s$ of any story s in $L_i$. In other words, an upper bound on a score of u may be below $\mu_s$ for every S∈$L_i$:

$$A_1 + \sum_{j \geq i} u_j \cdot ms(L_j) \leq \min_{s \in L_i} \mu_s. \quad \text{Condition (1)}$$

Should Condition (1) not hold, we may process $L_i$ as shown in Algorithm 3, lines 8-9, for example. Should Condition (1) hold, we may skip list $L_i$ and proceed to list $L_{i+1}$, and may again check Condition (1), and so on, for example. Note that such skipping may make some accumulated scores less accurate (e.g., lower than they should be). Observe however, that these may be scores of exactly the stories in $L_i$ that we skipped because Tweet u would not make it into their $R_s$ sets even with a full score. Thus, making an accumulated score of these stories lower may not change the overall outcome of the algorithm.

In certain example implementations, although Condition (1) may allows one to skip a whole list it $L_i$, it may be less likely to hold for longer lists, while skipping such lists may make a greater difference for the evaluation time. In certain instances, even a single story with $\mu_s$=0 at a middle of a list may prevent skipping that list. As such, in certain instances one may resort to a more fine-grained skipping strategy. For example, one may skip a segment of a list until a first story violates Condition (1), i.e., first s in $L_i$ for which $$A_1 + \sum_{j \geq i} u_j \cdot ms(L_j) > \mu_s.$$

One may then process that story by updating its score in the accumulators (line 9 in Algorithm 3), and then again look for the next story in the list that violates the condition (1). Thus, one may, for example, use a primitive next($L_i$, pos, UB) in which, e.g., given a list $L_i$, a starting position pos in that list, and a value of $$UB = A_1 + \sum_{j \geq i} u_j \cdot ms(L_j),$$

returns a next story s in $L_i$ such that $$A_1 + \sum_{j \geq i} u_j \cdot ms(L_j) > \mu_s.$$

Figure 5:
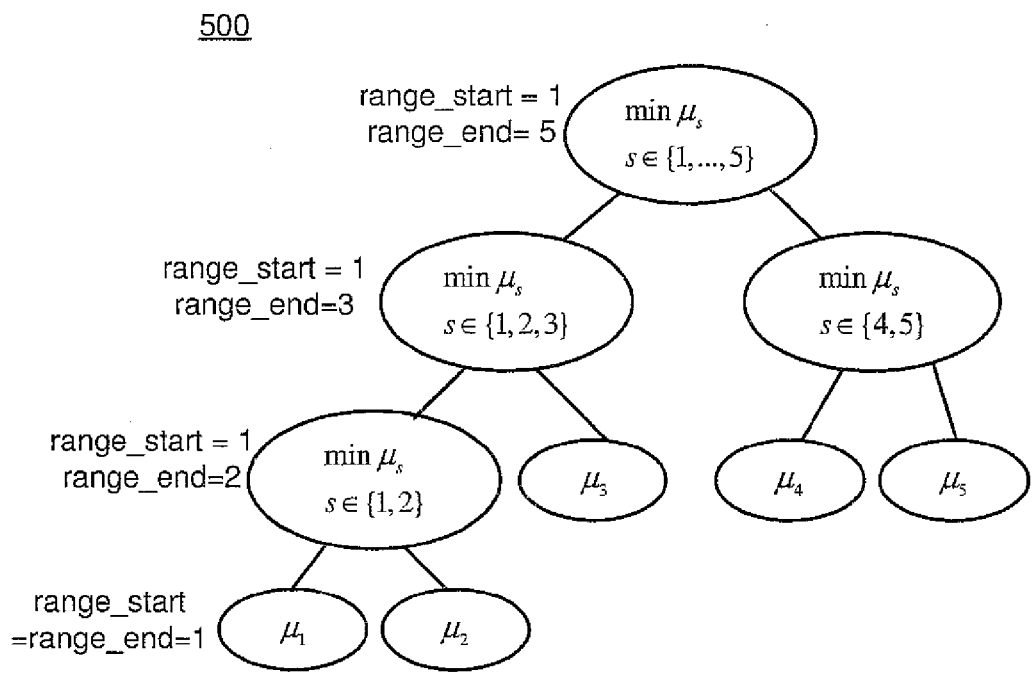
FIG. 5 is an illustrative diagram showing an example hierarchical structure representing a list of subscriber encoded data files, in accordance with certain example implementations.

Note that next($L_i$,pos,UB) may, for example, be more efficient than just traversing stories in $L_i$ and comparing their $\mu_s$ to UB, as this may take the same or a similar number of steps as an original algorithm might perform traversing $L_i$. As such, one may use a tree-based data structure for each list $L_i$ that supports two operations: next(pos,UB) corresponding to a next primitive (e.g., as defined above), and update(s,$\mu_s$), e.g., that updates a data structure when $\mu_s$ of a story s in $L_i$ changes. More specifically, for every posting list $L_i$ one may build a balanced binary tree $I_i$ where leafs represent the postings $S_1$, $S_2, \ldots, S_{|L_i|}$ in $L_i$ and store their corresponding $\mu_s$ values. Each internal node n in $I_i$ may store n·$\mu_s$, the minimum $\mu$ value of its sub-tree, for example. A subtree rooted at n may include postings with indices in a range n.range_start to n.range_end, and as such one may consider that n is responsible for these indices. By way of example, FIG. 5 shows a possible tree $I_i$ 500 for an $L_i$ with five postings.

Example Algorithm 4 (below) presents a pseudo-code for operation next(pos, UB) of a tree $I_i$.

---

Algorithm 4 Example pseudo-code for operation next of tree $I_i$

```
 1: Input: pos ∈ [1,|L_i|]
 2: Input: UB
 3: Output: next(L_i, pos, UB)
 4: endIndex ← findMaxInterval(I_i.root)
 5: if (endIndex = |L_i|) return ∞ //skip remainder of L_i
 6: if (endIndex = ⊥) return pos //no skipping is possible
 7: return endIndex + 1
 8: procedure findMaxInterval(node)
 9:     if (node.μ > UB) return node.range_end
10:     if (isLeaf(node)) return ⊥
11:     p ← ⊥
12:     if (pos ≤ node.left.range_end) then
13:         p ← findMaxInterval(node.left)
14:         if (p < node.left.range_end) return p
15:     q ← findMaxInterval(node.right)
16:     if (q ≠ ⊥) return q
17:     return p
```

---

Example Algorithm 4 uses a recursive subroutine findMaxInterval, which gets a node as a parameter (and pos and UB as implicit parameters) and returns endIndex—the maximal index of a story s in $L_i$ which appears at least in position pos in $L_i$ and for which $\mu_s \geq$ UB (e.g., this may be the last story that may safely be skipped). If node.$\mu$>UB (line 9), all stories in a sub-tree rooted at node may be skipped. Otherwise, we check whether pos is smaller than the last index for which node's left son is responsible (line 12). If so, we may, for example, proceed by finding a maximal index in the left subtree that may be skipped, e.g., by invoking findMaxInterval recursively with node's left son as the parameter. If a maximal index to be skipped may not be the last in node's left subtree (line 14) we may not skip any postings in the right subtree. If all postings in the left subtree may be skipped, or in case pos is larger than all indices in node's left subtree, a last posting to be skipped may be in node's right subtree. We therefore may proceed by invoking findMaxInterval with node's right son as the parameter.

In a situation where skipping may not be possible, a top-level call to findMaxInterval may return ⊥, and next in turn may return pos. If findMaxInterval returns a last index in $L_i$, next may return ∞, indicating that we may skip over all postings in $L_i$. Otherwise, for example, any position end Index returned by findMaxInterval may be the last position that may be skipped, and thus next may return endIndex+1.

Although findMaxInterval may, for example, proceed by recursively traversing both the left and the right son of node (e.g., in lines 13 and 15, respectively), observe that the right sub-tree may be traversed in two cases: 1) if the left sub-tree is not traversed, i.e., the condition in line 12 evaluates to false, or 2) if the left son is examined but the condition in line 9 evaluates to true, indicating that the whole left sub-tree can be safely skipped. In both cases, a traversal may examine the left son of a node, but may not go any deeper into the left sub-tree. Thus, for example, next(pos;UB) may take O(log|$L_i$|) steps. Further, update(s,$\mu_s$) may, for example, be performed by finding a leaf corresponding to s and updating the $\mu$ values stored at each node in a path from this leaf to the root of $I_i$.

In an attempt to reduce memory footprint, one may, for example, embed a tree into an array of size 2|$L_i$|. In certain example implementations, one may attempt to reduce memory footprint further by making each leaf in $I_i$ responsible for a range of l consecutive postings in $L_i$ (instead of a single posting) and use a lowest $\mu_s$ of a story in this range as a value stored in the leaf. While this example modification may slightly reduce a number of postings an algorithm skips, it may reduce the memory footprint of trees by a factor of l or a lookup complexity by O(log l), which may be overall beneficial in certain implementations. By way of example, in certain example implementations it is believed that a value of l in a range of between about 32 and about 1024 (e.g., depending on the index size) may result in an acceptable memory-performance tradeoff.

An example skipping TAAT for publish-subscribe algorithm is provided in Algorithm 5 (below). Example Algorithm 5 maintains a set l of such trees, consults it to allow skipping over intervals of posting list (e.g., as described above), and updates affected trees once $\mu_s$ for some s changes. Note that if such change occurs, one may update all trees which contain s (e.g., see example Algorithm 6, lines 9 and 10, which shows a procedure that attempts to insert a Tweet u into $R_s$ and updates trees). Enumerating these trees may be considered equivalent to maintaining a forward index whose size may be of a same order as a size of an inverted index of S.

To increase skipping in certain example implementations, one may use an optimization of ordering story ids, e.g., in an ascending order of their $\mu_s$. This may reduce chances of encountering a "stray" story with low $\mu_s$ in a range of stories with high $\mu_s$ in a posting list, thus possibly allowing for longer skips. Such a (re)ordering may, for example, be performed periodically, as $\mu_s$ of stories change.

---

Algorithm 5
Example skipping TAAT for publish-subscribe algorithm

```
 1: Input: Index of S
 2: Input: Query u
 3: Input: R_{s_1}, R_{s_2}, ..., R_{s_n} —min-heaps of size k for all stories in S
 4: Output: Updated min-heaps R_{s_1}, R_{s_2}, ..., R_{s_n}
 5: Let L_1, L_2, ..., L_{|u|} be the posting lists of terms in u, in the
    descending order of their maximal score
 6: Let I_1, I_2, ..., I_{|u|} be the trees for the posting lists
 7: A[s] ← 0 for all s — Accumulators vector
 8: for i∈[1, 2, ..., |u|] do
 9:     UB ← A_1 + Σ_{j≥i} u_j · ms(L_j)
10:     pos ← I_i · next(1, UB)
11:     while pos ≤ |L_i| do
12:         ⟨s, ps(s, i)⟩ ← posting at position pos in L_i
13:         A[s] ← A[s] + u_i · ps(s,i)
14:         pos ← I_i · next(pos,UB)
15:     for every s such that A[s] > 0 do
16:         processScoredResult( s, u, A[s], R_s, I)
17: return R_{s_1}, R_{s_2}, ..., R_{s_n}
```

Algorithm 6 An example procedure that attempts
to insert a Tweet u into $R_s$ and updates trees

```
1: Procedure processScoredResult(s,u,score,R_s,I)
2:   μ_s ← min. score of a Tweet in R_s if |R_s| = k, 0 otherwise
3:   if μ_s < score then
4:      if |R_s| = k, then
5:         Remove the least scored Tweet from R_s
6:      Add (u, score) to R_s
7:      μ'_s ← min. score of a Tweet in R_s if |R_s| = k, 0 otherwise
8:      if μ'_s ≠ μ_s then
9:         for j ∈ terms of s do
10:           I_j. update(s, μ'_s)
```

Let us next consider an example DAAT for publish-subscribe algorithm. A DAAT may, for example, provide an alternative strategy where the current top-k documents may be maintained as min-heap, and each document encountered in one of the lists may be fully scored and considered for insertion to the current top-k. Example Algorithm 7 (below) traverses the posting lists in parallel, while each list maintains a "current" position. In this example, we denote a current position in list L by L.curPosition, a current story by L.cur, and a partial score of the current story by L.curPs. In this example, a current story with a lowest id may be picked, scored and the lists where it was a current story may be advanced to the next posting. A potential advantage compared to an example TAAT may be that there may be no need to maintain a potentially large set of partially accumulated scores.

Algorithm 7 Example DAAT for publish-subscribe Algorithm

```
1: Input: Index of S
2: Input: Query u
3: Input: R_{s_1}, R_{s_2},..., R_{s_n} —min-heaps of size k for all stories in S
4: Output: Updated min-heaps R_{s_1}, R_{s_2},..., R_{s_n}
5: Let L_1, L_2,..., L_{|u|} be the posting lists of terms in u
6: for i ∈ [1, 2,...,|u|] do
7:    Reset the current position in L_i to the first posting
8: while not all lists exhausted do
9:    s ← min_{1≤i≤|u|} L_i.cur
10:   score ← 0
11:   for i ∈ [1, 2,...,|u|] do
12:      if L_i.cur = s then
13:         score ← score + u_i · L_i.curPs
14:         Advance by 1 the current position in L_i
15:   μ_s ← min. score of a Tweet in R_s if |R_s| = k, 0 otherwise
16:   if μ_s < score then
17:      if |R_s| = k then
18:         Remove the least scored Tweet from R_s
19:      Add (u, score) to R_s
20: return R_{s_1}, R_{s_2},..., R_{s_n}
```

Next let us consider an example skipping DAAT for publish-subscribe algorithm. Similarly to TAAT algorithms, it may be possible to skip postings in a DAAT based algorithm too. One popular algorithm is WAND (e.g., see, A. Z. Broder, et al., "Efficient Query Evaluation Using A Two-Level Retrieval Process", CIKM '03 Proceedings Of The Twelfth International Conference On Information And Knowledge Management, 2003). In each iteration WAND orders posting lists in an ascending order of the current document id and looks for the pivot list—the first list $L_i$ such that a sum of maximal scores in lists $L_i, \ldots, L_{i-1}$ may be below a lowest score θ in a current top-k:

$$\sum_{j<i} u_j \cdot ms(L_j) \leq \theta.$$

Then, for example, if the current document in the pivot list—the pivot document—equals to the current document in list $L_1$, the pivot document may be scored and considered for insertion into the current top-k. Otherwise, the current positions in lists $L_1, \ldots, L_{i-1}$ may, for example, be skipped to a document id greater than or equal to the pivot document. This skipping is possible since by the ordering of the lists, and by definition of the pivot list, the maximal score of the documents with ids lower than that of the pivot document may be below θ.

In certain example implementations herein, one may modify WAND's skipping condition and skip only stories s in list $L_i$ for which:

$$\sum_{j \leq i} u_j \cdot ms(L_j) \leq \mu_s. \qquad \text{Condition (2)}$$

In example Algorithm 8 (below) one may make use of a tree-based technique to efficiently find, for every list $L_i$, a first story from a current position in $L_i$ onward that violates Condition (2). From a set of these stories one may, for example, choose a pivot story to be a minimal according to story id. The list containing the pivot story may then, for example, be said to be the pivot list. Then, similar to WAND, the pivot story may be either scored and the processed Tweet u may be considered for insertion to $R_s$, or the lists may be skipped to a story greater than or equal to the pivot story. As in the example skipping TAAT for publish-subscribe algorithm, example Algorithm 8 may attempt to insert a Tweet into $R_s$ of fully scored stories and updates affected trees.

Algorithm 8 Example skipping DAAT
for publish-subscribe algorithm

```
1: Input: Index of S
2: Input: Query u
3: Input: R_{s_1}, R_{s_2},..., R_{s_n} —min-heaps of size k for all stories in S
4: Output: Updated min-heaps R_{s_1}, R_{s_2},..., R_{s_n}
5: Let L_1, L_2,..., L_{|u|} be the posting lists of terms in u
6: Let I_1, I_2,..., I_{|u|} be the trees for the posting lists
7: for i ∈ [1, 2,...,|u|] do
8:    Reset the current position in L_i to the first posting
9: while true do
10:   Sort posting lists in the ascending order of their current story ids
11:   p ← ⊥ - index of the pivot list
12:   UB ← 0
13:   S ← L_{|u|}.cur
14:   for i ∈ [1, 2,...,|u|] do
15:      if L_i.cur ≥ s then
16:         break
17:      UB ← UB + u_i · ms(L_i)
18:      pos ← I_i.next(L_i.curPosition, UB)
19:      if pos ≤ |L_i| then
20:         s' ← story at position pos in L_i
21:         if s' < s then
22:            p ← i
23:            s ← s'
24:   if p = ⊥ then
25:      break
26:   if L_0.cur ≠ L_p.cur then
27:      for i ∈ [1, 2,..., p - 1]do
28:         Skip the current position in L_i to a story ≥ s
29:      else
30:         score ← 0
31:         i ← 0
```

-continued

Algorithm 8 Example skipping DAAT
for publish-subscribe algorithm

```
32:         while L_i.cur = L_p.cur do
33:             score ← score + u_i · L_i.curPs
34:             Advance by 1 the current position in L_i
35:             i ← i + 1
36:         processScoredResult( s,u,score,R_s,I )
37: return R_{s_1}, R_{s_2},..., R_{s_n}
```

As illustrated through the example implementations presented herein, it can be seen that a publish-subscribe paradigm may be employed in maintaining sets of publisher encoded data files that may be associated with subscriber encoded data files. Furthermore, the various resulting methods and apparatuses may provide for real-time or near real-time use (e.g., annotation) of associated content in systems that may experience a significantly high-volume of publisher encoded data files, subscriber encoded data files, and/or content requests.

In accordance with certain further aspects, example techniques provided herein may further be employed to establish a personalized micro-blog or social network feed and/or other like specific content alert capability by identifying content of interest, e.g., via one or more subscriber encoded data files. Hence, for example, a top-k result set of publisher encoded data files (e.g., Tweets, social commentary, etc.) may be identified in response to an applicable content request.

Thus, as illustrated in various example implementations and techniques presented herein, in accordance with certain aspects a method may be provided for use as part of a special purpose computing device or other like machine that accesses digital signals from memory and processes such digital signals to establish transformed digital signals which may then be stored in memory.

Some portions of the detailed description have been presented in terms of processes or symbolic representations of operations on data signal bits or binary digital signals stored within memory, such as memory within a computing system or other like computing device. These process descriptions or representations are techniques used by those of ordinary skill in the data signal processing arts to convey the substance of their work to others skilled in the art. A process is here, and generally, considered to be a self-consistent sequence of operations or similar processing leading to a desired result. The operations or processing involve physical manipulations of physical quantities. Typically, although not necessarily, these quantities may take the form of electrical or magnetic signals capable of being stored, transferred, combined, compared or otherwise manipulated. It has proven convenient at times, principally for reasons of common usage, to refer to these signals as bits, data, values, elements, symbols, characters, terms, numbers, numerals or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "associating", "identifying", "determining", "allocating", "establishing", "accessing", "obtaining", "maintaining", "querying", or the like refer to the actions or processes of a computing platform, such as a computer or a similar electronic computing device (including a special purpose computing device), that manipulates or transforms data represented as physical electronic or magnetic quantities within the computing platform's memories, registers, or other information (data) storage device(s), transmission device(s), or display device(s).

According to an implementation, one or more portions of an apparatus, such as computing device 200 (FIG. 2), for example, may store binary digital electronic signals representative of information expressed as a particular state of the device, here, computing device 200. For example, an electronic binary digital signal representative of information may be "stored" in a portion of memory 204 by affecting or changing the state of particular memory locations, for example, to represent information as binary digital electronic signals in the form of ones or zeros. As such, in a particular implementation of an apparatus, such a change of state of a portion of a memory within a device, such the state of particular memory locations, for example, to store a binary digital electronic signal representative of information constitutes a transformation of a physical thing, here, for example, memory device 204, to a different state or thing.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While certain exemplary techniques have been described and shown herein using various methods and apparatuses, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all implementations falling within the scope of the appended claims, and equivalents thereof.

What is claimed is:

1. A method comprising: with a computing platform,
generating and maintaining a subscriber index for one or more of a plurality of subscriber encoded content files comprising at least informational story content, and a publisher index for one or more of a plurality of publisher encoded content files comprising at least micro-blog and/or social network content;
determining a content-based score and a recency score for the one or more of the plurality of publisher encoded content files for association with the one or more of the plurality of subscriber encoded content files, and using, at least in part, the determined content-based score and the determined recency score to determine a ranking score for the one or more of the plurality of publisher encoded content files for the association with the one or more of the plurality of subscriber encoded content files;
determining for the one or more of the plurality of subscriber encoded content files a top-k set of publisher encoded content files based, at least in part, on the determined ranking score;

in response to obtaining a new publisher encoded content file:
  querying the subscriber index using at least a portion of the new publisher encoded content file to determine a ranking score for the new publisher encoded content file with regard to the one or more of the plurality of subscriber encoded content files, wherein the ranking score is based, at least in part, on a content-based score and a recency score, wherein the recency score is based at least in part on a difference between a time of page view and a time of creation of the new publisher encoded content file; and
  determining whether the new publisher encoded content file replaces one publisher encoded content file in the top-k set of publisher encoded content files based, at least in part, on a comparison of the ranking score of the new publisher encoded content file and the ranking score of the top-k set of publisher encoded content files.

2. The method as recited in claim 1, wherein the recency score decreases over a time-interval from the time of creation to the time of page view, and the new publisher encoded content file is included in the top-k set of publisher encoded content files providing the ranking score exceeds a threshold ranking score associated with the top-k set of publisher encoded content files.

3. The method as recited in claim 1, and further comprising, with the computing platform: in response to a request for the at least one of the plurality of subscriber encoded content files, identifying the top-k set of publisher encoded content files.

4. The method as recited in claim 1, wherein determining the top-k set of publisher encoded content files further comprises: ranking at least the publisher encoded content files.

5. The method as recited in claim 1, wherein determining the top-k set of publisher encoded content files further comprises:
  determining the top-k set of publisher encoded content files using a top-k retrieval publish-subscribe process comprising at least one of: a term-at-a-time (TAAT) publish-subscribe process; a skipping TAAT publish-subscribe process; a document-at-a-time (DAAT) publish-subscribe process; or a skipping DAAT publish-subscribe process.

6. The method of claim 1, wherein the indices are generated at least in part based on an indication of content relevancy.

7. The method of claim 1, wherein replacing one publisher encoded content file in the top-k set of publisher encoded content files comprises: comparing the ranking score of the new publisher encoded content file with the ranking score of one or more publisher encoded content files of the top-k set of publisher encoded content files, and responsive to the comparison, removing a publisher encoded content file with a lower ranking score from the top-k set of publisher encoded content files and adding the new publisher encoded content file to the top-k set of publisher encoded content files.

8. The method of claim 7, further comprising: receiving a new subscriber encoded content file; querying the publisher index based, at least in part, on a portion of the new subscriber encoded content file; and retrieving a set of publisher encoded content files responsive to the query.

9. A computing platform comprising:
  memory; and
  a processing unit to:
    generate and maintain, in the memory, a subscriber index for one or more of a plurality of subscriber encoded content files to comprise at least informational story content, and a publisher index for one or more of a plurality of publisher encoded content files to comprise at least micro-blog and/or social network content;
    determine a content-based score and a recency score for the one or more of the plurality of publisher encoded content files for association with the one or more of the plurality of subscriber encoded content files, and use, at least in part, the to be determined content-based score and the to be determined recency score to determine a ranking score for the one or more of the plurality of publisher encoded content files for the association with the one or more of the plurality of subscriber encoded content files;
    determine for the one or more of the plurality of subscriber encoded content files a top-k set of publisher encoded content files to be based at least in part on the to be determined ranking score;
    in response to a new publisher encoded content file:
      query the subscriber index, at least a portion of the new publisher encoded content file to be employed to determine a ranking score for the new publisher encoded content file with regard to the one or more of the plurality of subscriber encoded content files, wherein the ranking score is to be based, at least in part, on a content-based score and a recency score, wherein the recency score is to be based at least in part on a difference between a time of page view and a time of creation of the new publisher encoded content file; and
      determine whether the new publisher encoded content file is to replace one publisher encoded content file in the top-k set of publisher encoded content files to be based, at least in part, on a comparison of the ranking score of the new publisher encoded content file and the ranking score of the top-k set of publisher encoded content files.

10. The computing platform as recited in claim 9, the processing unit to further:
  in response to a request for the at least one of the plurality of subscriber encoded content files, identify the top-k set of publisher encoded content files.

11. The computing platform as recited in claim 9, the processing unit to further:
  determine the top-k set of publisher encoded content files from at least the publisher encoded content files to be ranked.

12. The computing platform as recited in claim 9, the processing unit to further:
  determine the top-k set of publisher encoded content files to comprise use of a top-k retrieval publish-subscribe process to comprise at least one of: a term-at-a-time (TAAT) publish-subscribe process; a skipping TAAT publish-subscribe process; a document-at-a-time (DAAT) publish-subscribe process; or a skipping DAAT publish-subscribe process.

13. The computing platform of claim of claim 9, the processing unit to generate the indices to be based at least in part on an indication of content relevancy.

14. The computing platform of claim 9, wherein to replace one publisher encoded content file in the top-k set of publisher encoded content files is to: compare the ranking score of the new publisher encoded content file with the ranking score of one or more publisher encoded content files of the top-k set of publisher encoded content files, and responsive to the comparison, remove a publisher encoded content file with a lower ranking score from the top-k set of publisher encoded content files and add the new publisher encoded content file to the top-k set of publisher encoded content files.

15. An article computing:
a non-transitory computer readable medium having stored therein computer implementable instructions executable by a processing unit to:
generate and maintain a subscriber index for one or more of a plurality of subscriber encoded content files to comprise at least informational story content, and a publisher index for one or more of the plurality of publisher encoded content files to comprise at least micro-blog and/or social network content;
determine a content-based score and a recency score for the one or more of the plurality of publisher encoded content files for association with the one or more of the plurality of subscriber encoded content files, and use, at least in part, the to be determined content-based score and the to be determined recency score to determine a ranking score for the one or more of the plurality of publisher encoded content files for the association with the one or more of the plurality of subscriber encoded content files;
determine for the one or more of the plurality of subscriber encoded content files a top-k set of publisher encoded content files to be based, at least in part, on the to be determined ranking score;
in response to a new publisher encoded content file:
query the subscriber index, at least a portion of the new publisher encoded content file to be employed to determine a ranking score for the new publisher encoded content file with regard to the one or more of the plurality of subscriber encoded content files, wherein the ranking score is to be based, at least in part, on a content-based score and a recency score, wherein the recency score is to be based at least in part on a difference between a time of page view and a time of creation of the new publisher encoded content file; and
determine whether the new publisher encoded content file is to replace one publisher encoded content file in the top-k set of publisher encoded content files to be based, at least in part, on a comparison of the ranking score of the new publisher encoded content file and the ranking score of the top-k set of publisher encoded content files.

16. The article as recited in claim 15, the computer implementable instructions being further executable by the processing unit to:
in response to a request for the at least one of the plurality of subscriber encoded content files, identify the top-k set of publisher encoded content files.

17. The article as recited in claim 15, the computer implementable instructions being further executable by the processing unit to:
determine the top-k set of publisher encoded content files from at least the publisher encoded content files to be ranked.

18. The article as recited in claim 15, the computer implementable instructions being further executable by the processing unit to:
determine the top-k set of publisher encoded content files to comprise use of a top-k retrieval publish-subscribe process to comprise at least one of: a term-at-a-time (TAAT) publish-subscribe process; a skipping TAAT publish-subscribe process; a document-at-a-time (DAAT) publish-subscribe process; or a skipping DAAT publish-subscribe process.

19. The article of claim 15, wherein the instructions are further executable to generate the indices to be based at least in part on an indication of content relevancy.

20. The article of claim 15, wherein to replace one publisher encoded content file in the top-k set of publisher encoded content files the computer implementable instructions are to be further executable by the processing unit to: compare the ranking score of the new publisher encoded content file with the ranking score of one or more publisher encoded content files of the top-k set of publisher encoded content files, and responsive to the comparison, remove a publisher encoded content file with a lower ranking score from the top-k set of publisher encoded content files and add the new publisher encoded content file to the top-k set of publisher encoded content files.

* * * * *